United States Patent [19]

Terada et al.

[11] Patent Number: 5,356,657
[45] Date of Patent: Oct. 18, 1994

[54] METHOD OF MANUFACTURING AN ELECTROLUMINESCENT DEVICE

[75] Inventors: Kousuke Terada, Tenri; Akiyoshi Mikami, Yamatotakada; Kouji Taniguchi, Shiki; Koichi Tanaka, Nara; Masaru Yoshida, Ikoma; Shigeo Nakajima, Nara, all of Japan

[73] Assignee: Sharp Kabushiki Kaisha, Osaka, Japan

[21] Appl. No.: 779,235

[22] Filed: Oct. 18, 1991

Related U.S. Application Data

[62] Division of Ser. No. 442,634, Nov. 29, 1989, Pat. No. 5,087,531.

[30] Foreign Application Priority Data

Nov. 30, 1988 [JP] Japan ................................ 63-304820
Nov. 30, 1988 [JP] Japan ................................ 63-304821

[51] Int. Cl.$^5$ ........................................... H01J 9/12
[52] U.S. Cl. ............................. 427/66; 428/690; 428/917; 427/69; 427/255.1; 118/715; 445/11
[58] Field of Search ............. 445/10, 11, 12, 14, 445/15, 16, 17, 21; 428/690, 691, 917; 313/503, 506, 507, 509; 427/248.1, 255.1, 255.7, 66, 69; 118/715

[56] References Cited

U.S. PATENT DOCUMENTS

| | | | |
|---|---|---|---|
| 4,389,973 | 6/1983 | Suntola et al. | 428/255.7 |
| 4,728,581 | 3/1988 | Kane et al. | 428/690 |
| 4,907,043 | 3/1990 | Uekita et al. | 357/17 |
| 5,087,531 | 2/1992 | Terada et al. | 428/690 |

FOREIGN PATENT DOCUMENTS 0342063 11/1989 European Pat. Off. .

Primary Examiner—Charles R. Nold
Attorney, Agent, or Firm—Birch, Stewart, Kolasch & Birch

[57] ABSTRACT

Disclosed is an electroluminescent device including a substrate and an electroluminescent film on the substrate wherein the electroluminescent film is composed of a II-VI group compound semiconductor matrix and an electroluminescent center element; the improvement being present in that the electroluminescent film has a crystal structure of a hexagonal system, and contains the electroluminescent center element in a concentration (Ci) of 0.5 to 4 at. % within a thickness of 0.2 micrometer from the side of the substrate and in a concentration (Cr) of 0.15 to 0.7 at. % at the residual portion, and Ci is larger than Cr, and the process for preparing the same.

10 Claims, 6 Drawing Sheets

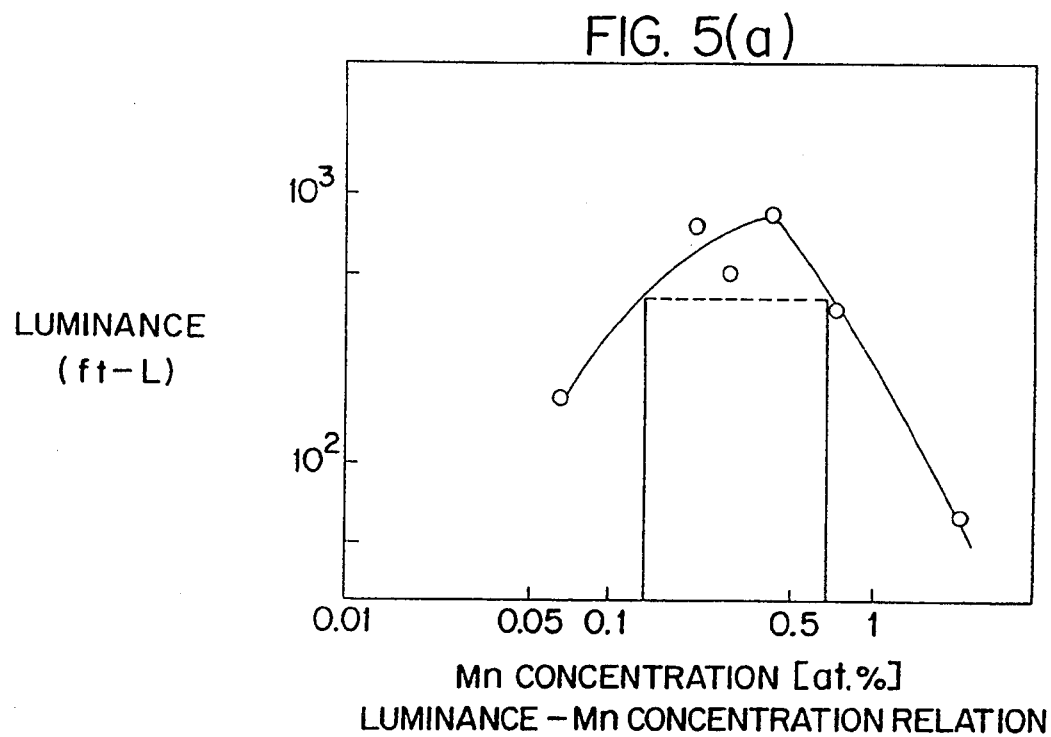
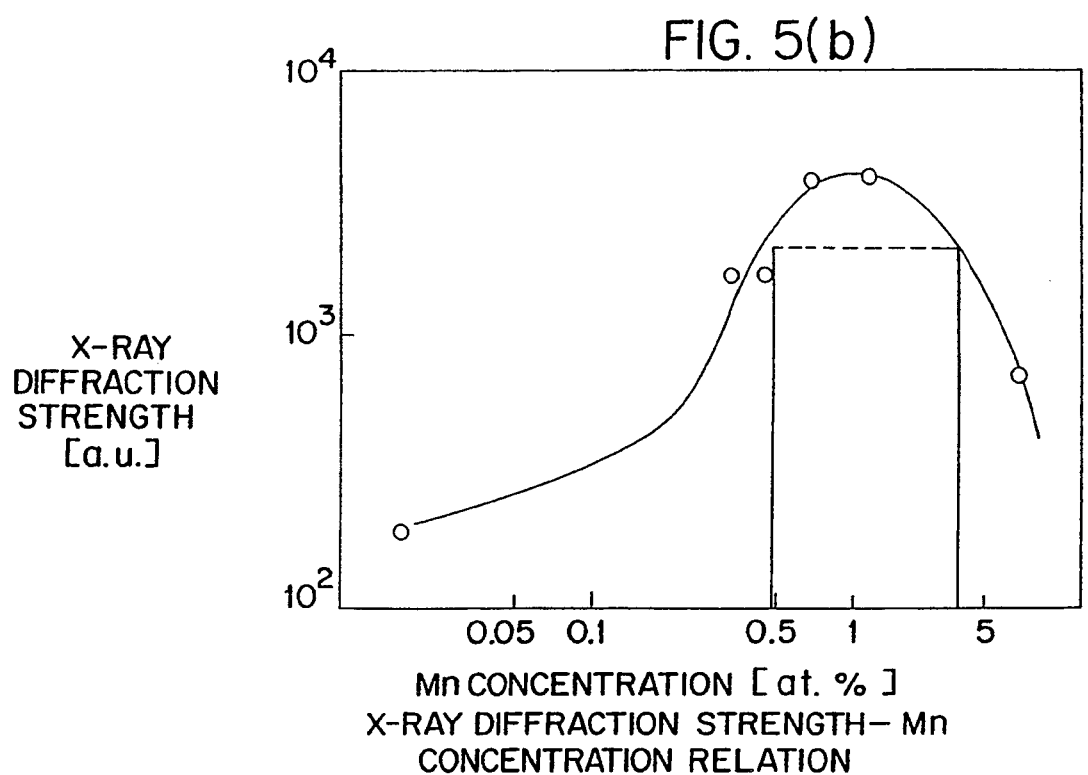

METHOD OF MANUFACTURING AN ELECTROLUMINESCENT DEVICE

This application is a divisional of copending application Ser. No. 07/442,634, filed on Nov. 29, 1989, U.S. Pat. No. 5,087,531. The entire contents of which are hereby incorporated by reference.

BACKGROUND OF THE INVENTION

1. Field of the Invention

The present invention relates to an electroluminescent device and a process for preparing the same.

2. Description of Related Art

An electroluminescent device which is practically employed is composed of a ZnS matrix and a manganese atom contained as an electroluminescent center element in the matrix. In order to produce a thin film electroluminescent panel which has high luminance and reliability and which is capable of driving at a low voltage, high crystallinity of the electroluminescent device is significant.

The electroluminescent device is conventionally produced by an electron beam vapor deposition method which employs pellets of a mixture of ZnS and Mn, or by an atomic layer epitaxy method wherein Zn, Mn and S vapors are alternatively provided onto a substrate to each accumulate one atomic layer. The electron beam vapor deposition method is very simple and suitable for mass production, but the obtained device is poor in reliability and luminance and can be driven at as high as 200 volts. The atomic layer epitaxy method imparts high crystallinity for which the obtained device is excellent in reliability and luminance, but it is difficult to mass produce because of a low film-forming rate.

SUMMARY OF THE INVENTION

The present invention provides an electroluminescent device comprising a substrate and an electroluminescent film on the substrate wherein said electroluminescent film is composed of a II-VI group compound semiconductor matrix and an electroluminescent center element; the improvement being present in that said electroluminescent film has a crystal structure of a hexagonal system, and contains the electroluminescent center element in a concentration (Ci) of 0.5 to 4 at. % within a thickness of 0.2 micrometer from the side of the substrate and in a concentration (Cr) of 0.15 to 0.7 at. % at the residual portion, and wherein Ci is larger than Cr.

The present invention also provides a vapor phase growing method for an electroluminescent device comprising introducing raw materials for a II-VI group semiconductor and an electroluminescent center element into a reaction tube together with hydrogen gas or inert gas and forming an electroluminescent film which is composed of a II-VI group compound semiconductor matrix and an electroluminescent center element, wherein HCl gas is introduced into the reaction tube with at least one of the raw materials and said raw materials are decomposed at a temperature of more than the decomposing temperature of the raw materials in the reaction tube.

It has been found that the crystallinity of the electroluminescent film is highly governed by a crystallinity within a thickness of 0.2 micrometer from the side of the substrate (hereinafter "crystallinity of the initial growing layer"). In conventional processes, the initial growing layer has very poor crystallinity which makes crystallinity on the whole poor. The present inventors focuses on a concentration of manganese in the film and a high crystallinity of the initial growing layer attained by controlling the manganese concentration.

BRIEF DESCRIPTION OF THE DRAWINGS

FIG. 5(a) shows a relation between Mn concentration and luminance;

FIG. 5(b) shows a relation between Mn concentration and X ray diffraction strength.

DETAILED DESCRIPTION OF THE PREFERRED EMBODIMENTS OF THE INVENTION

The substrate is preferably a glass plate which is covered with a transparent electronode film (ITO) and an amorphous insulation film, such as $SiO_2$, $Si_3N_4$ and the like. The EL film is preferably composed of a II-VI compound semiconductor matrix and an EL center element. Examples of the II-VI compound semiconductors are ZnS, ZnSe and the like. Typical examples of the EL center elements are manganese, terbium, samarium and the like. ZnS and Mn are exemplified hereinafter.

According to the present invention, the EL film (ZnS:Mn film) is required to have a hexagonal system. An electron beam diffraction pattern of the obtained ZnS:Mn film shows that Mn concentrations of less than 0.1 at. % are a cubic system and those of more than 0.1 at. % are a hexagonal system. The crystallinity of the ZnS:Mn film can also be varied by a temperature of the substrate, because temperatures of more than 400° C. are stable in a hexagonal system. It therefore is understandable that the crystal structure of the ZnS:Mn film is varied between the cubic and hexagonal systems by growing conditions.

The manganese concentration of the ZnS:Mn film is 0.5 to 4 at. % within a thickness of 0.2 micrometer from the side of the substrate (initial growing layer) and 0.15 to 0.7 at. % at the residual portion. If the concentration (Ci) in the initial growing layer is less than 0.5 at. %, the crystallinity of the EL film is poor. If it is more than 4 at. %, the luminance of the EL device is poor. The thickness of initial growing layer can not exceed 2 micrometers. If it is more than 2 micrometers, the luminance of the EL device is poor because of its concentration quenting. The Mn concentration (Cr) of the residual portion of the ZnS:Mn film should be smaller than that (Ci) of the initial growing layer (Ci>Cr), so that the crystallinity of the initial growing layer is higher than that of the residual portion.

In the case of the ZnS:Mn film, the EL device of the present invention may be prepared from three raw materials, that is, dimethyl zinc, hydrogen sulfide and tricarbonylmethylcyclopentadienyl manganese.

Figure 1A:
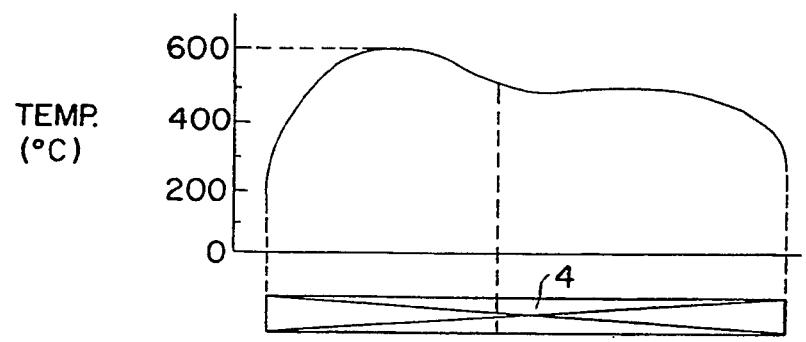
FIG. 1 schematically shows a vapor phase growing apparatus for the present invention.
Figure 1B:
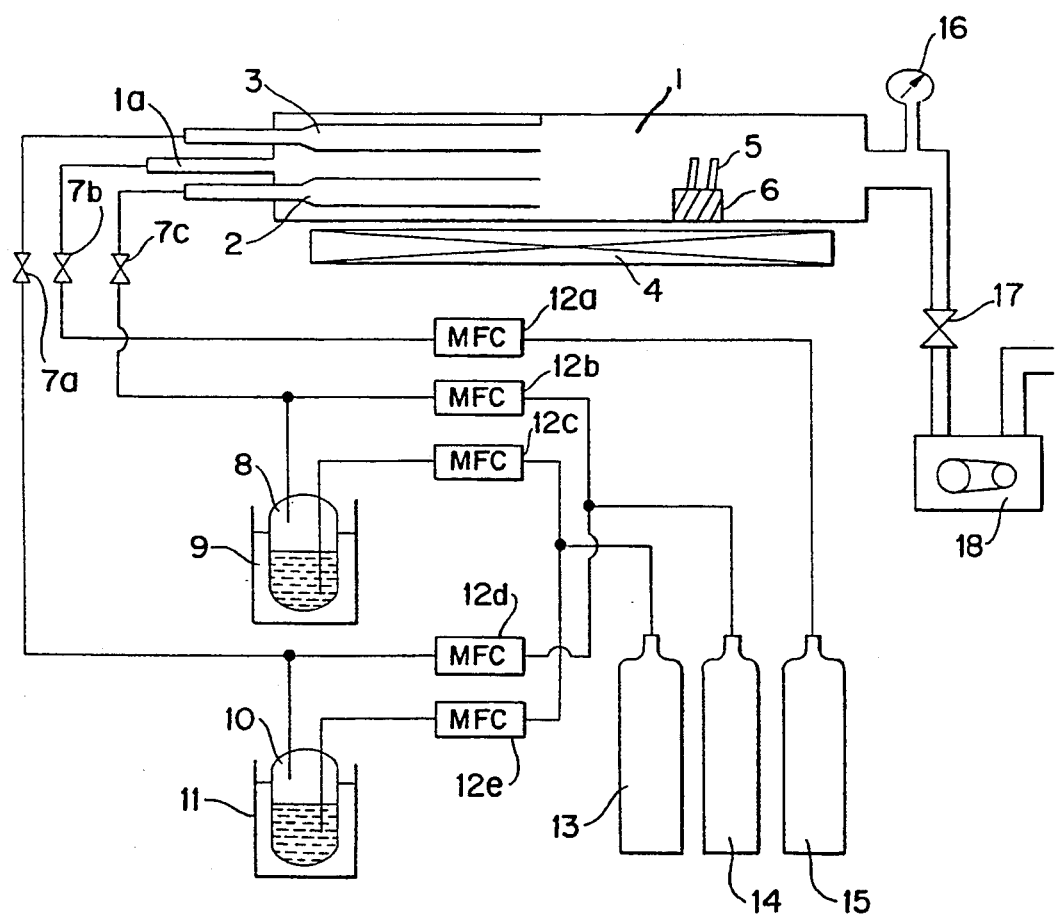

FIG. 1 schematically shows a vapor phase growing apparatus. The number 1 shows a quartz reaction tube having a 1 m length and a 5 cm inside diameter, 1a is a branch present at one end of the tube 1 and 2 and 3 are introducing tubes present at one end of the tube 1. The reaction tube 1 is placed in an electric furnace 4 of which temperature distribution in a longitudinal direction is controlled as shown in FIG. 1, wherein the higher temperature is set 600° C. The reaction waste produced in the reaction tube 1 is evacuated through a main valve 17 by an oil rotary pump 18. A substrate holder 6 is placed in a reaction range of the reaction tube 1 and an undercoated glass substrate 5 is obliquely put on the holder 6. A bubbler 8 which contains dimethyl zinc is put in a temperature controlled bath 9 and another bubbler 10 which contains TCM is put in another temperature controlled bath 11.

Hydrogen gas from a hydrogen gas cylinder 13 is sent to a mass flow controller 12c to control a flow amount and then bubbled in the bubbler 8, so that dimethyl zinc is transported with a carrier gas (hydrogen gas) by a bubble transporting method. HCl gas from a HCl gas cylinder 14 is sent to a mass flow controller 12b to control the amount of HCl gas to two times larger than that of dimethyl zinc in molar ratio, and then combined with the flow of dimethyl zinc and hydrogen gas followed by delivery to the introducing tube 2 through a valve 7c.

$H_2S$ gas diluted with hydrogen gas from a gas cylinder 15 is flow-controlled through a mass flow controller 12a so as to flow the same molar amount as that of dimethyl zinc, and then sent to the branch 1a of the reaction tube 1 through a valve 7b.

Hydrogen gas from a hydrogen gas cylinder 13 is flow-controlled by a mass flow controller 12e and then sent to a bubbler 10, so that TCM is transported with a carrier gas (hydrogen gas) by a bubble transporting method. HCl gas from a HCl gas cylinder 14 is sent to a mass flow controller 12d to flow two times larger than that of TCM in molar ratio and then sent with the flow of TCM and hydrogen gas to the introducing tube 3 through a valve 7a.

Since dimethyl zinc and TCM are instable at an elevated temperature, dimethyl zinc is decomposed at about 400° C. to form Zn and TCM is decomposed at about 500° C. to form Mn. On forming Zn and Mn, they are reacted with HCl gas in the introducing tubes 2 and 3 to respectively produce $ZnCl_2$ and $MnCl_2$ according to the following formula;

$$Zn + 2HCl \rightarrow ZnCl_2 + H_2 \quad (1)$$

$$Mn + 2HCl \rightarrow MnCl_2 + H_2 \quad (2)$$

$H_2S$ gas, $ZnCl_2$ and $MnCl_2$ are reacted in a reaction area between both ends of the reaction tube 1 to deposit a ZnS;Mn film on the substrate 5.

Figure 2:
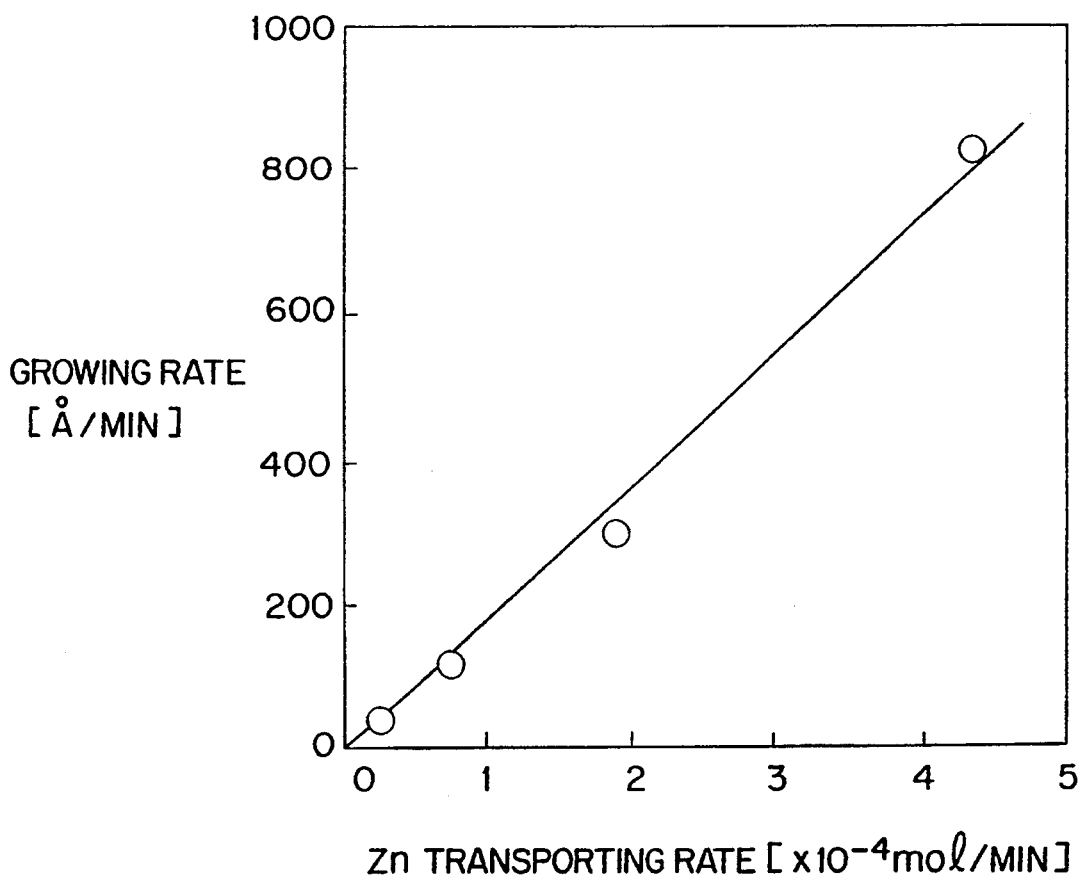
FIG. 2 shows a relation between Zn transporting rate and ZnS; Mn film growing rate.
Figure 3:
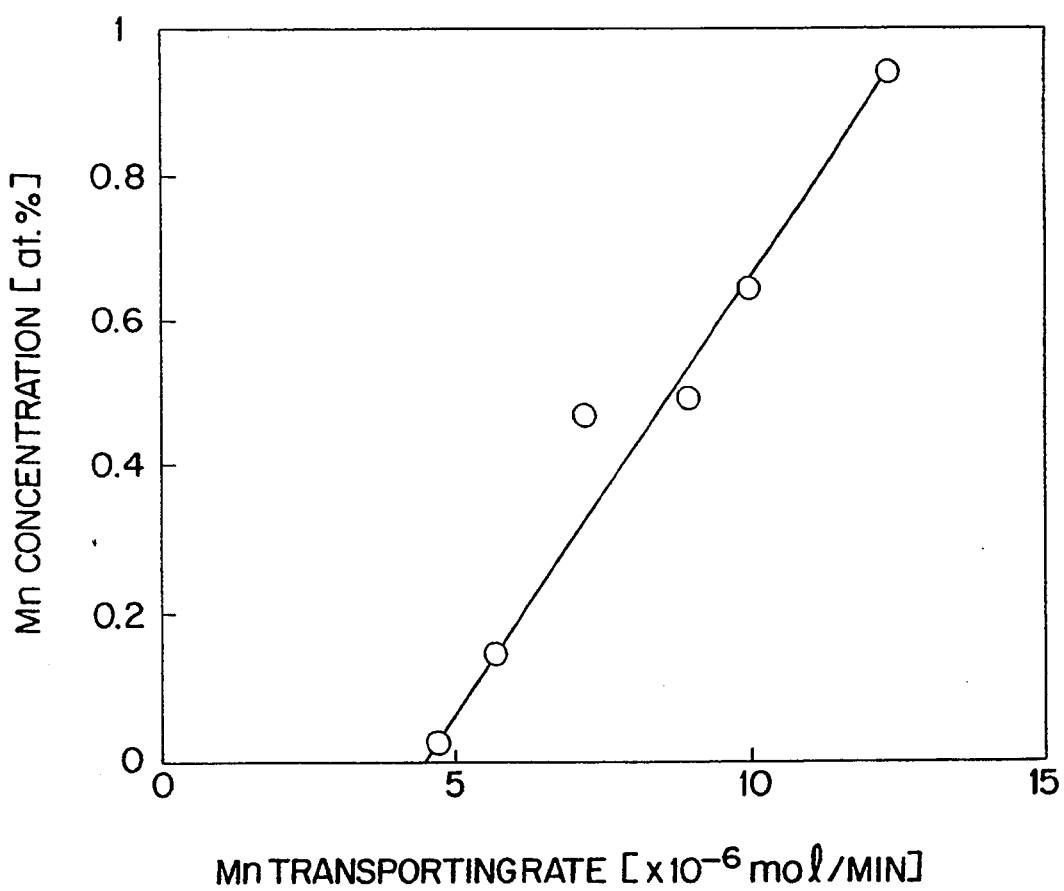
FIG. 3 shows a relation between Mn transporting rate and Mn concentration in the ZnS; Mn film.

A relation between Zn transporting rate and ZnS;Mn film growing rate is investigated and the result is shown in FIG. 2. The ZnS;Mn film growing rate is approximately proportional to the Zn transporting rate, thus the thickness of the ZnS:Mn film being easily controlled by the transporting rate of the raw materials. FIG. 3 shows a relation between the Mn transporting rate and Mn concentration in the ZnS:Mn film, when the Zn transporting rate is made constant. The Mn concentration rapidly increases from an Mn transporting rate of about $5 \times 10^{-6}$ mol/min. It is believed that the reason why the Mn concentration is not proportional to the Mn transporting rate is that the increase of the Mn transporting rate raises the partial pressure of HCl gas which etches the deposited ZnS:Mn film. This is confirmed by the measurement of the gas composition in the reaction tube.

Figure 4A:
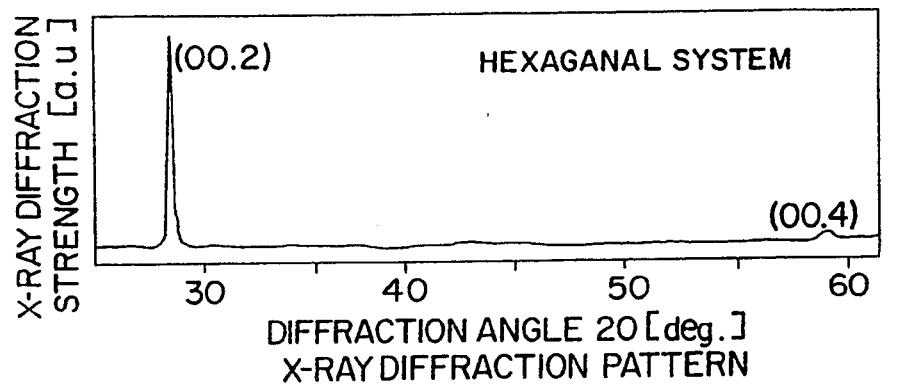
FIG. 4(a), (b) and (c) show X ray diffraction patterns.
Figure 4B:
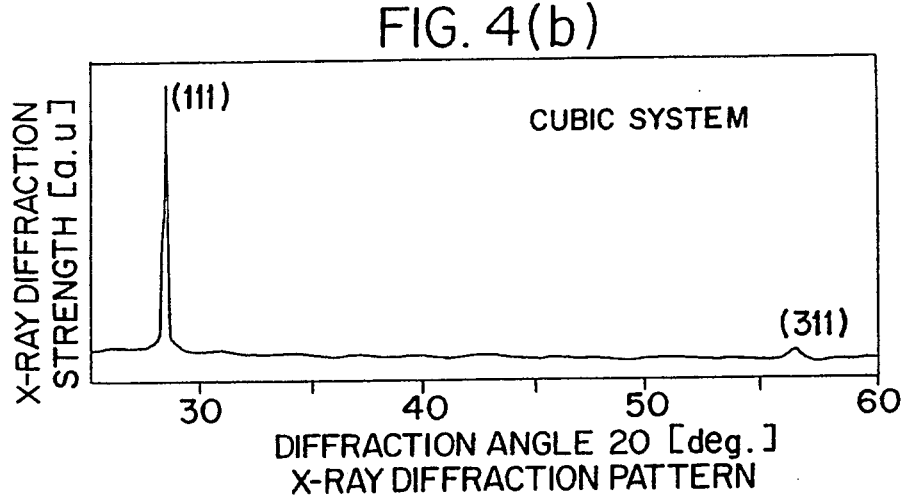
Figure 4C:
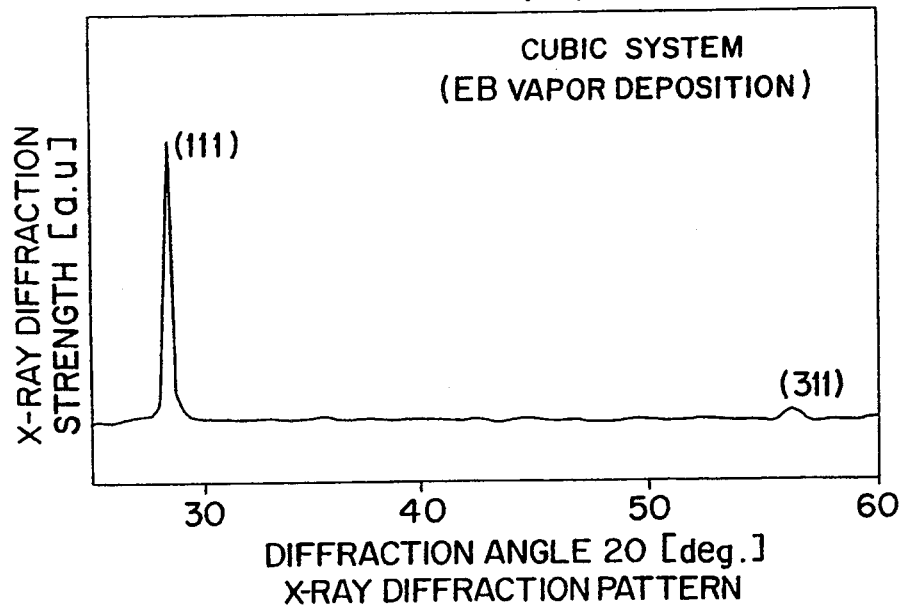

FIGS. 4(a), (b) and (c) show X-ray diffraction patterns. FIG. 4(a) shows a pattern of a hexagonal system ZnS:Mn film (Mn concentration=0.3 at. %) which is produced at a substrate temperature (Ts) of 500° C., FIG. 4(b) shows a pattern of a cubic system ZnS:Mn film (Mn concentrate=0.1 at. %, Ts=500° C.) and FIG. 4(c) shows a pattern of a cubic system ZnS:Mn film (Mn concentration=0.3 at. %, Ts=200° C.) which is produced by a conventional electron beam vapor deposition. The hexagonal system ZnS:Mn film of FIG. 4(a) does not have diffraction peaks other than (002) and (004), but the cubic system ZnS:Mn film of FIG. 4(b) and (c) has a small peak at (311) other than (111). For comparing orientation degrees between the (002) plane and the (111) plane, the half-width of the rocking curve is determined about the X-ray diffraction peaks and the result shows the similar values of 6.9° and 7.1° in respect to the samples (a) and (b). This indicates that the cubic system ZnS:Mn film grows a (311) plane in a high possibility. It therefore appears that the hexagonal system ZnS:Mn film has higher orientation properties than the cubic system ZnS:Mn film. When the obtained EL films are observed by a scanning type electron microscope, it is found that the hexagonal system ZnS:Mn film has a larger crystalline particle size and better surface smoothness than the cubic system ZnS:Mn film.

FIG. 5(a) shows a relation between Mn concentration and luminance and FIG. 5(b) shows a relation between Mn concentration and X-ray diffraction strength. The luminance increases as the Mn concentration increases, and reaches a maximum value at about 0.5 at. %, above which it decreases because of concentration quenching. When the ZnS:Mn film is applied to an EL device, if a permitted range is considered half of the maximum luminance, Mn concentration is within the range of 0.15 to 0.7 at. %. Since the X-ray diffraction strength of FIG. 5(b) shows the crystallinity of the film, a preferred range of Mn concentration is within the range of 0.5 to 4 at. %.

Figure 6:
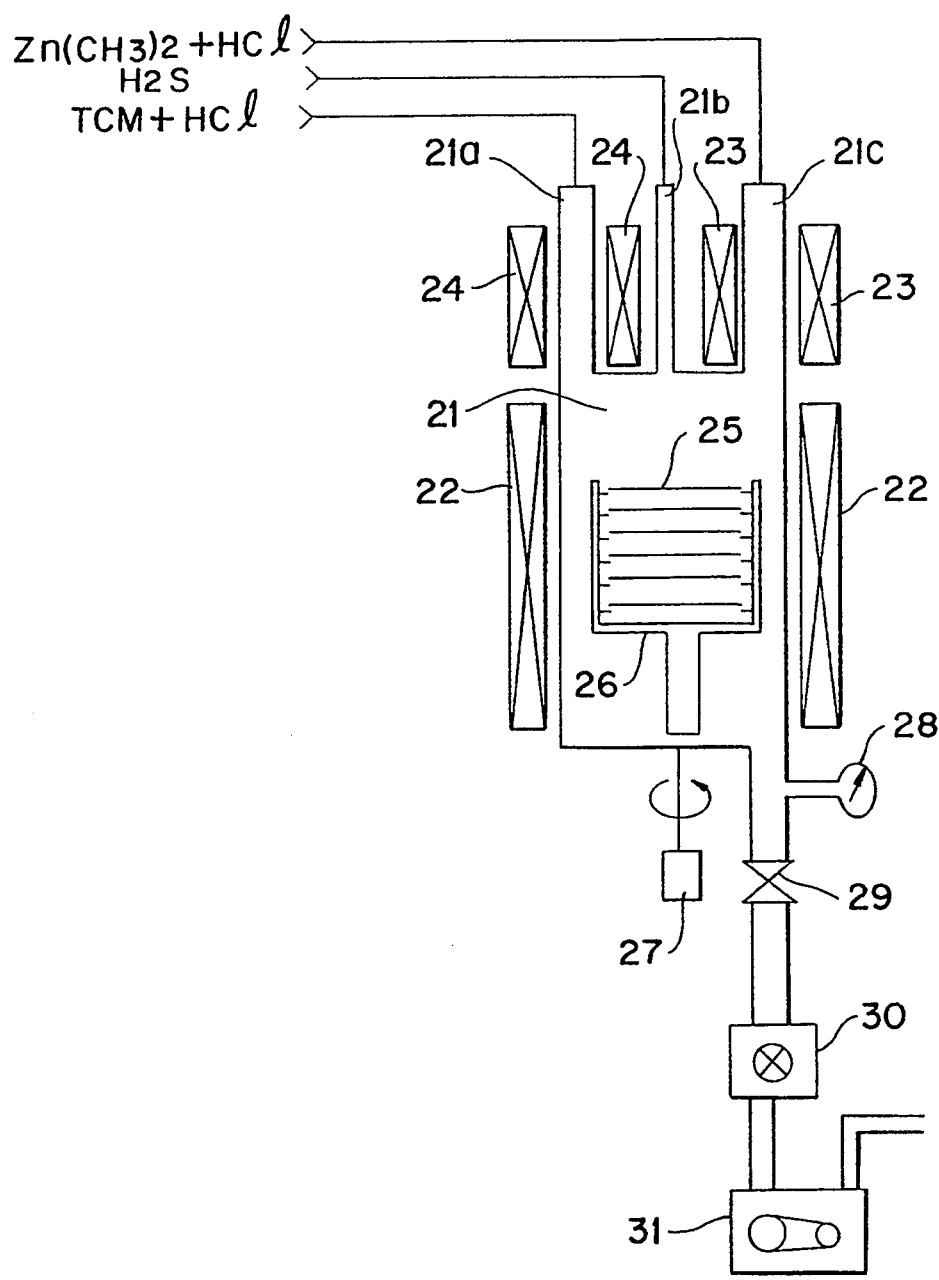
FIG. 6 shows another vapor phase growing apparatus for the present invention.

FIG. 6 schematically shows another apparatus for producing the EL device having a large area. A reaction tube 21 is made from quartz and has an inside diameter of 28 cm and a height of 70 cm. The tube 21 is equipped with raw material introducing tubes 21a, 21b and 21c at an upper end, around which electric furnaces 23 and 24 are placed. In the reaction tube 21, a substrate holder 26 is placed and another electric furnace 22 is put around the tube 21 near the substrate holder 26. Substrates 25 are placed in the holder 26 and rotated by a rotating motor 27.

In the vapor phase growing method of the present invention, the reaction tube has a maximum temperature of 300° to 600° C. for Zn and 500° to 700° C. for Mn. The substrate is preferably heated to 400° to 600° C.

The EL film of the present invention has a hexagonal system and superior crystallinity. Since the EL film contains the electroluminescent center element in a concentration (Ci) of 0.5 to 4 at. % within a thickness of 0.2 micrometer from the side of the substrate and in a concentration (Cr) of 0.15 to 0.7 at. % at the residual portion, and Ci is larger than Cr, it maintains high luminance. The vapor phase growing method of the present invention can easily control the concentration of the electroluminescent center element in the EL film.

What is claimed is:

1. A vapor phase growing method for an electroluminescent device comprising the steps of:
   providing a substrate having a top surface, a bottom surface, and side surfaces;
   providing a quartz reaction tube having a temperature gradient from 300° C. to 700° C. for housing said substrate;
   introducing a raw material for a group II–VI compound semiconductor matrix and HCl gas into the quartz reaction tube;
   introducing a raw material for an electroluminescent center element and HCl gas into the quartz reaction tube;
   decomposing said raw materials in said quartz reaction tube to form first and second reactants, respectively;
   introducing hydrogen sulfide into the quartz reaction tube; and
   reacting said hydrogen sulfide with said first and second reactants to form an electroluminescent film having a crystal structure of a hexagonal system on said substrate;
   wherein the step of decomposing is at a temperature higher than the step of reacting, and
   wherein the center element of the electroluminescent film includes an initial growing layer in a concentration Ci of 0.5 to 4 atom % within a thickness of 02 μm from the side surfaces of the substrate and in a concentration Cr of 0.15 to 0.7 atom % at the residual portion whereby Ci is greater than Cr.

2. The vapor phase growing method according to claim 1, wherein said raw material for the electroluminescent center element comprises dimethyl zinc.

3. The vapor phase growing method according to claim 2, wherein dimethyl zinc is decomposed at about 400° C. to form Zn.

4. The vapor phase growing method according to claim 1, wherein the electroluminescent center element is manganese, terbium or samarium.

5. The vapor phase growing method according to claim 4, wherein the raw material for manganese is tricarbonyl methylcyclopentadienylmanganese (TCM).

6. The vapor phase growing method according to claim 5, wherein TCM is decomposed at about 500° C. to form Mn.

7. The vapor phase growing method according to claim 1, wherein a temperature of said substrate is greater than 400° C.

8. The vapor phase growing method according to claim 1, wherein the temperature of the quartz reaction tube ranges from 300° to 600° C. for the first reactant and from 500° to 700° C. for the second reactant.

9. The vapor phase growing method according to claim 8, wherein the first reactant is Zn and the second reactant is Mn.

10. The vapor phase growing method according to claim 1, wherein the substrate is heated to a temperature in the range of 400° to 600° C. within the quartz reaction tube.

* * * * *